(12) United States Patent
Skiles (10) Patent No.: US 9,275,526 B2
(45) Date of Patent: Mar. 1, 2016

(54) CHECKOUT STATION

(75) Inventor: Chris Skiles, Springdale, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 311 days.

(21) Appl. No.: 13/331,541

(22) Filed: Dec. 20, 2011

(65) Prior Publication Data

US 2013/0153656 A1   Jun. 20, 2013

(51) Int. Cl.
*G06K 15/00* (2006.01)
*G07G 1/00* (2006.01)
*G07G 1/12* (2006.01)

(52) U.S. Cl.
CPC .............. *G07G 1/0045* (2013.01); *G07G 1/12* (2013.01)

(58) Field of Classification Search
USPC ........................................ 235/383
See application file for complete search history.

(56) References Cited

U.S. PATENT DOCUMENTS

| | | | |
|---|---|---|---|
| 3,094,191 A | 6/1963 | Potrafke | |
| 6,241,149 B1 | 6/2001 | Baitz et al. | |
| 7,621,446 B2 | 11/2009 | Addison | |
| 2003/0115103 A1* | 6/2003 | Mason | G06Q 20/20 705/16 |
| 2007/0138269 A1 | 6/2007 | Baitz et al. | |
| 2007/0235531 A1* | 10/2007 | Addison | A47F 9/04 235/383 |
| 2009/0198582 A1* | 8/2009 | Tokorotani | G06Q 20/204 705/17 |
| 2011/0225055 A1 | 9/2011 | Takahashi | |
| 2011/0225056 A1 | 9/2011 | Akiyama | |
| 2013/0153656 A1 | 6/2013 | Skiles | |

FOREIGN PATENT DOCUMENTS

DE   10 2006 050 727   5/2008
JP   2003-275079   9/2003

OTHER PUBLICATIONS

British Search Report, dated May 23, 2013, issued in corresponding British Patent Application No. 1222785.6.
British Search Report, dated Feb. 3, 2014, issued in corresponding British Patent Application No. 1222785.6.
U.S. Appl. No. 13/799,276; Office Action mailed Aug. 6, 2014.
U.S. Appl. No. 13/799,276; Notice of Allowance mailed Dec. 3, 2014.
PCT; Appl. No. PCT/US2013/075036; Written Opinion mailed Aug. 22, 2014.
PCT; Appl. No. PCT/US2013/075036; International Search Report mailed Aug. 22, 2014.

* cited by examiner

*Primary Examiner* — Michael G Lee
*Assistant Examiner* — David Tardif
(74) *Attorney, Agent, or Firm* — Fitch, Even, Tabin & Flannery LLP (57) ABSTRACT

A checkout station includes a turntable that is rotatable between a first position and a second position and a barcode scanner that is attached to the turntable and is directed in a first direction in the first position and in a second direction in the second position.

25 Claims, 6 Drawing Sheets

CHECKOUT STATION

FIELD OF THE INVENTION

The present invention is generally directed to an apparatus and method for retail checkout stations. In particular, the present invention is directed to a checkout counter that can be conveniently converted between a cashier mode and a self-checkout mode.

DETAILED DESCRIPTION OF EXAMPLE EMBODIMENTS

In retail establishments, sales to customers normally take place at checkout stations located on the premise. Currently, sales in stores may occur in the form of cashier-assisted checkouts or self-checkouts that may be carried out in cashier stations or self-checkout stations, respectively. In cashier-assisted checkouts, a customer may place merchandise on a conveyor belt of the POS station. A cashier who stations near a receiving end of the conveyor belt may scan each item using a barcode scanner to check out the merchandise. After the cashier has checked out the merchandise for the customer, the customer may proceed along the checkout station side that is opposite to the cashier side to a pay station to complete the sale transaction. In contrast, in self-checkouts, the customer may scan each item at a checkout station by himself. After all merchandise has been recorded, the customer may proceed to pay for the purchase at the pay station.

Figure 1:
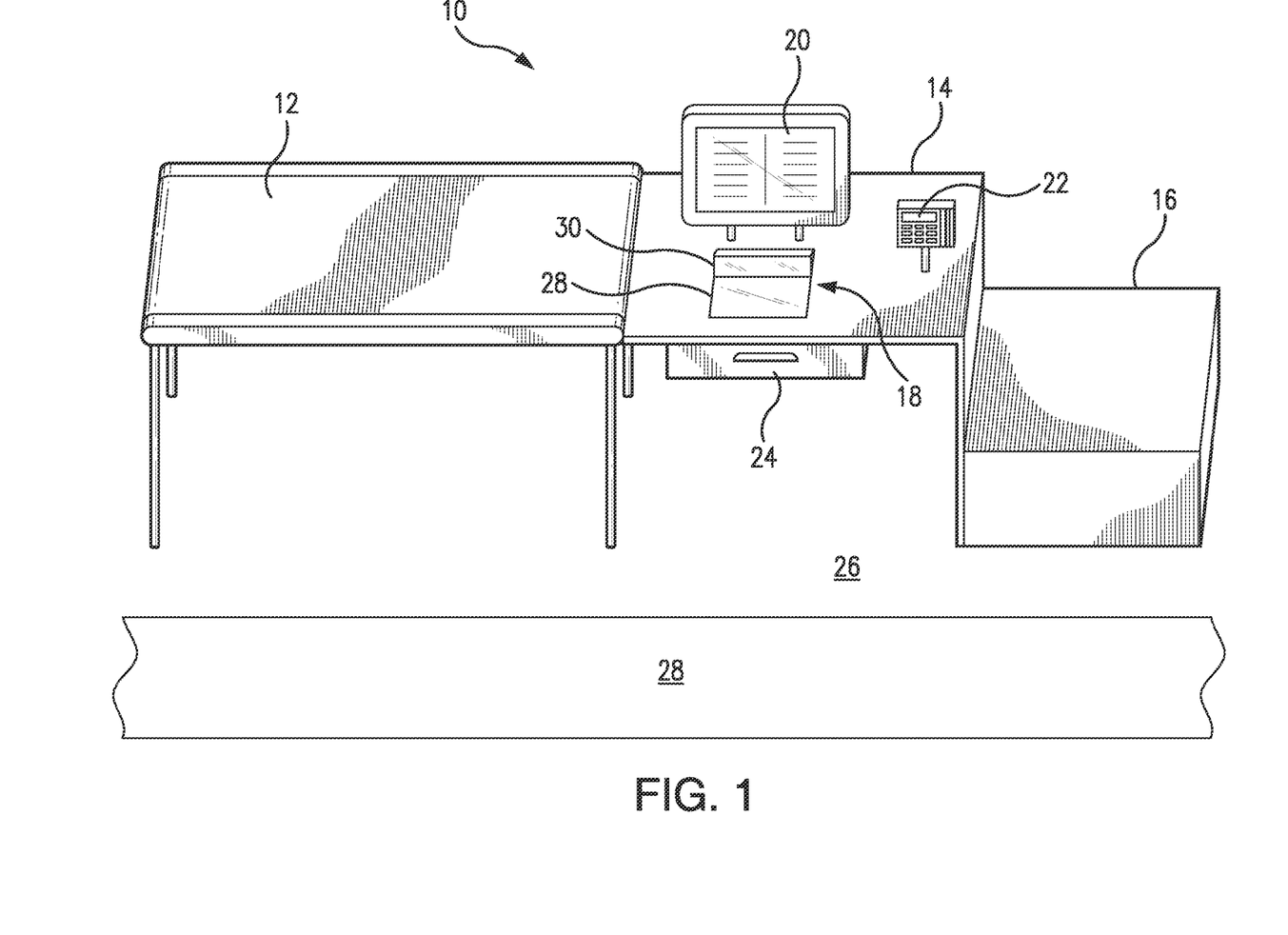
FIG. 1 illustrates a cashier-assisted checkout station.

Certain aspects of cashier-assisted checkouts are distinguishable from those of self-checkouts. First, current art constructs checkout stations for cashier-assisted checkouts differently from checkout stations for self-checkouts. FIG. 1 illustrates a cashier-assisted checkout station 10 that may include a conveyor belt 12, a pay station 14, and a bagging station 16. The pay station may further include a barcode scanner such as an optic scanner 18, a display screen 20, a credit/debit card reader/signature pad 22, and a retractable/removable cashier drawer 24 in which the cashier may store received cash, checks, and coupons. The cashier-assisted checkout station 10 may be configured with an optional recess 26 where the cashier may stand without interfering with traffic in the lane 28 behind the cashier. Since the cashier is responsible for scanning the merchandise, current art orients the optic scanner 18 and the display screen 20 of the cashier-assisted checkout stations 10 fixedly towards the cashier. For example, the optic scanner 18 may be a bi-optic scanner that may include a horizontal scanner 28 and a vertical scanner 30 which together form a scanning space facing the cashier. Further, the displayer screen 20 may be a touch screen also facing the cashier.

Figure 2:
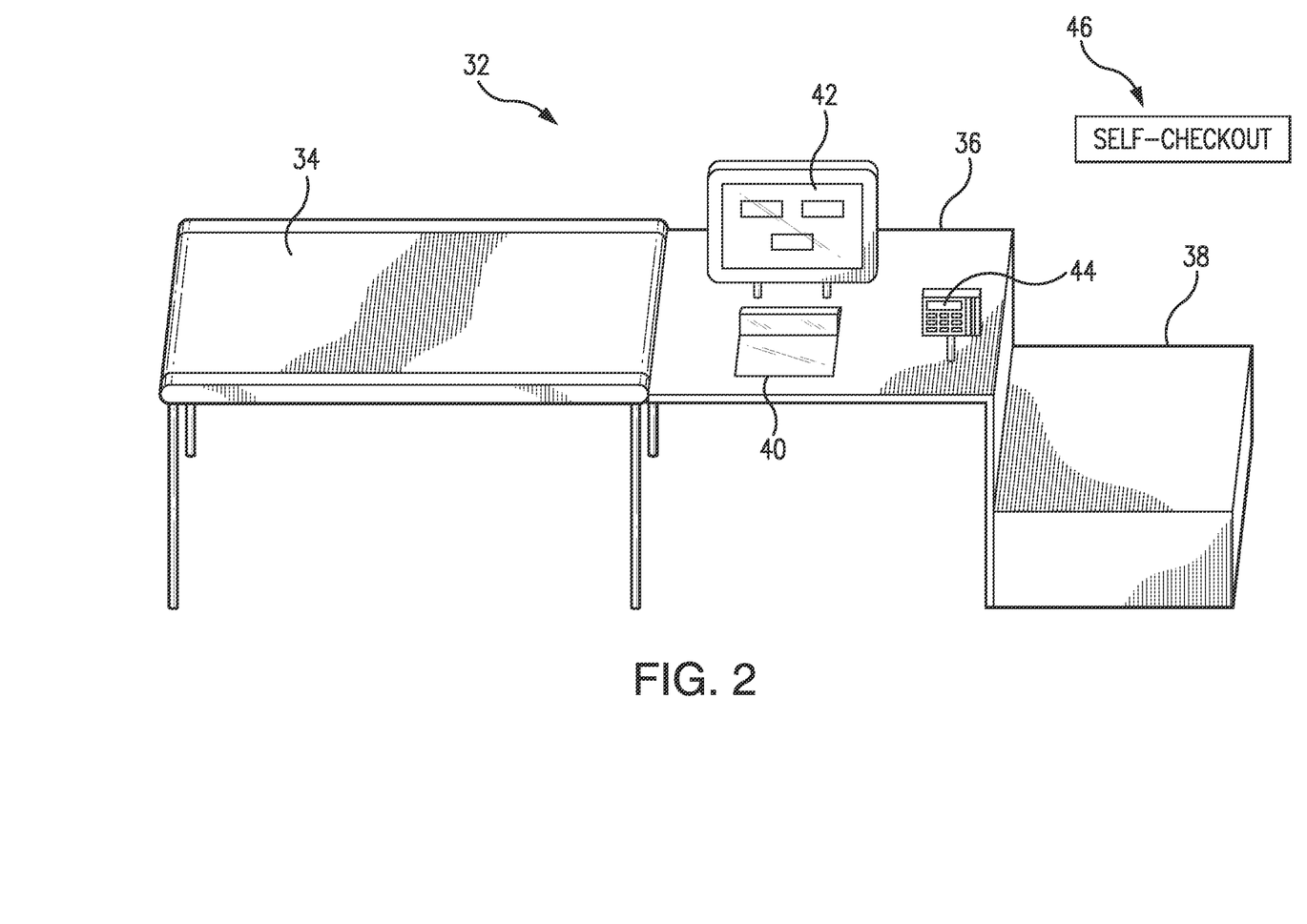
FIG. 2 illustrates a self-checkout station.

In contrast, FIG. 2 illustrates a self-checkout station 32 that may similarly include a conveyor belt 34, a pay station 36, and a bagging station 38. The pay station 32 of the self-checkout station may include a barcode scanner such as an optic scanner 40, a display screen 42, and a credit/debit card reader/signature pad 44. However, unlike the cashier-assisted checkout station 10, the self-checkout station 32 does not include a retractable/removable cashier drawer or a recess where the casher stands. Further, since only customers are primarily responsible for scanning the merchandise at self-checkout stations, the optic scanner 40 and display screen 42 are oriented fixedly toward one direction, i.e., the customer side of the self-checkout station 32. Finally, the self-checkout station 32 may include a signage 46 that indicates a particular checkout station is designated as "SELF-CHECKOUT." In practice, the signature may be an electronic sign that can be turned on and off to indicate whether the self-checkout station is in operation.

In addition to the differences in the physical construction of cashier-assisted checkout stations and self-checkout stations, the cashier-assisted checkout stations and self-checkout stations are commonly configured to run different point-of-sale (POS) applications designed specifically for cashier or customer to use. The POS system for cashiers may be designed for efficiency or expedited transactions because it may be assumed that cashiers are usually experienced in operating the POS system. In contrast, the POS system for self-checkout customers may be designed for intuitive use with plenty of prompts and helpful hints because it may be assumed that customers usually have less experience in operating the POS system. Further, the POS system for cashier may empower the cashier with certain authorities such as keying in the price of an item or overwriting a barcode scan. In contrast, the POS system for self-checkouts may be rigid and restrictive so that the self-checkout customer may not conduct unauthorized transactions. The self-checkout customer is required to contact a customer service representative for any specially handled transactions.

Thus, currently, the cashier-assisted checkout stations are designed and manufactured differently from self-checkout stations. Cashier-assisted checkout stations have different specifications and include different components than self-checkout stations. The different physical constructions between cashier-assisted checkout stations and self-checkout stations increase the ownership cost. First, stores may receive less volume discount for purchasing different models of checkout stations. Second, it may cost more to maintain different types of checkout stations than a single type of checkout station. In addition to cost issue, cashier-assisted stations and self-checkout stations usually occupy valuable spaces in retail stores. While self-checkout stations may usually open all the time, the cashier-assisted checkout stations may be idle from time to time depending on the availability of cashiers. The idle checkout stations occupy valuable retail spaces, but do not help reduce congestions at checkout lines.

Thus, there is a need for checkout stations that may be easily converted between a cashier-assisted checkout mode and a self-checkout mode so that the store may save costs for owning a single type of checkout station and run more efficiently for converting idle checkout stations into self-checkout mode.

Embodiments of the present invention may include a checkout station that may be converted between a cashier-assisted checkout mode and a self-checkout mode by re-orienting the facing direction of a display screen and a barcode scanner. Thus, the checkout station may act as a cashier-assisted checkout station in a first orientation of the display screen and/or the barcode scanner, and act as a self-checkout station in a second orientation of the display screen and/or the barcode scanner.

Embodiments of the present invention may include a checkout station that may include a turntable that is rotatable between a first position and a second position and a barcode scanner that is attached to the turntable and is directed in a first direction in the first position and in a second direction in the second position.

Embodiments of the present invention may includes a checkout system that may include a turntable that is rotatable between a first position and a second position, and a processor that is programmed to execute a point-of-sale (POS) application in a cashier-assisted checkout mode when the turntable is in the first position and to execute the POS application in a self-checkout mode when the turntable is in the second position.

Figure 3A:
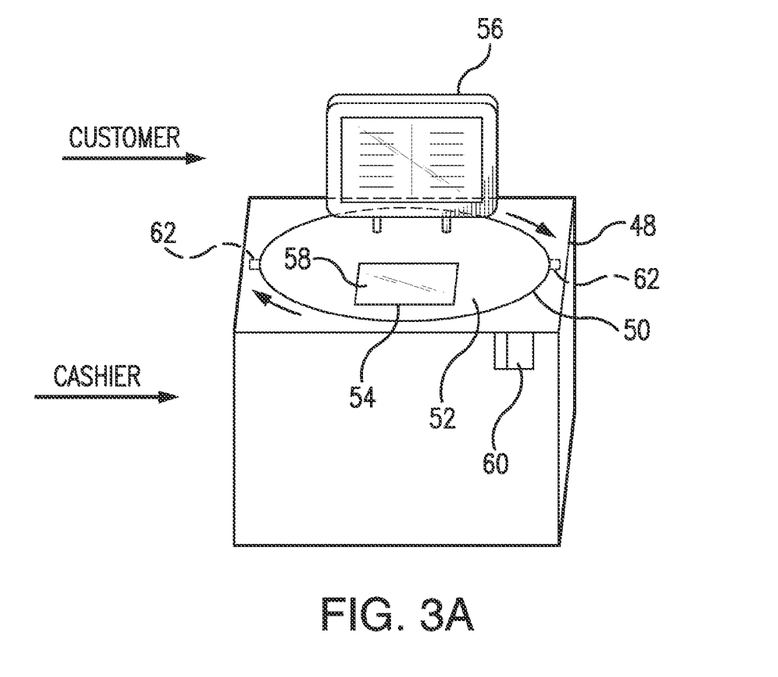
FIGS. 3A and 3B illustrate a checkout station according to an exemplary embodiment of the present invention.
Figure 3B:
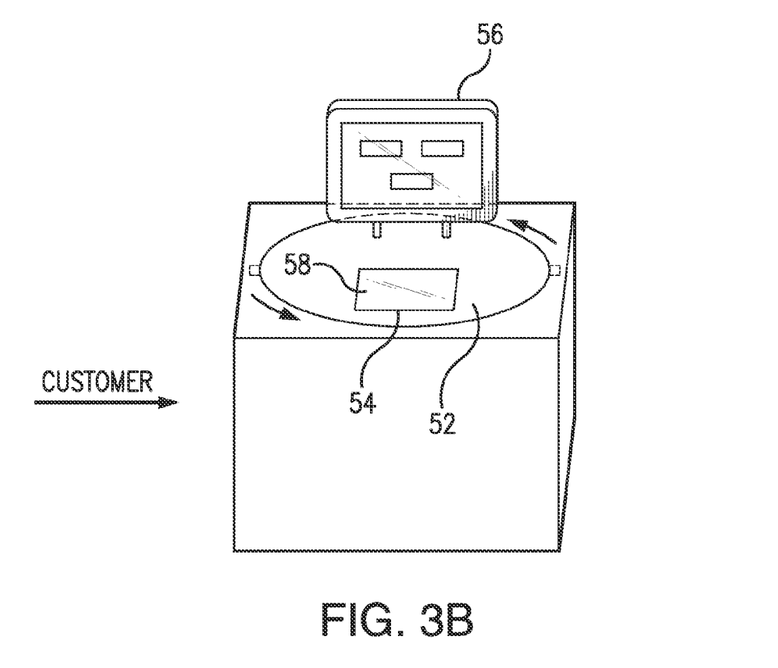

FIGS. 3A and 3B illustrate a checkout station according to an exemplary embodiment of the present invention, in which FIG. 3A reflects the first cashier-assisted checkout mode of the checkout station, and FIG. 3B reflects the second self-checkout mode of the checkout station. For clarity, the following FIGS. 3A and 3B focus on the pay station of a checkout station and omit the conveyor belt and bagging station. Referring to FIG. 3A, a checkout station may include a base platform 48 that may include a hollow 50 within a top surface of the base platform 48. In a preferred embodiment, the hollow 50 may be circular.

Within the hollow 50, the checkout station may include a turntable 52 that may include a rotatable solid surface on which a display screen 56 may be fixedly attached to the solid surface of the turntable 52. In one embodiment, the turntable 52 may be made from the same material as the top surface of the base platform 48. In an alternative embodiment, the turntable 52 may be made from a material that is different from the top surface of the base platform 48. In a preferred embodiment, the top surface of the turntable 52 may be circular and fit into the hollows 50. Further, the solid surface of the turntable 52 may include an opening 54 that may be covered by a transparent material such as glass. In one embodiment, a barcode scanner 58 such as a single-optic scanner may be attached to the turntable underneath the opening 54 (and the transparent material). The display screen 56 and the barcode scanner 58 through the opening 54 may be attached to the turntable 52 in such orientation that a cashier who stations at a first side of the base platform 48 may easily scan merchandise and operate on the display screen 56. In another embodiment, a bi-optic scanner may be attached to the turntable 52 with a first scanner underneath the top surface of the turntable 52 and a second scanner situated vertically above the top surface. In yet another embodiment, imagers may be used in places of optic scanners.

Since the display screen 56 and the barcode scanner 58 are fixedly attached to the turntable 52, the orientation of the display screen 56 and the barcode scanner 58 may change along with turns of the turntable 52. In one exemplary embodiment, the turntable 52 may be rotated back-and-forth between a first position that is oriented toward a first direction and a second position that is oriented toward a second direction. In one preferred embodiment, the first direction may be directed toward a first side at which the cashier stands, and the second direction may be directed toward a second side at which the customer stands. Since the cashier and the customer may be located at opposite sides of the base platform 48, the first and second positions of the turntable 52 may be approximately 180 degrees apart. FIG. 3A illustrates the turntable 52 at the first position according to which the checkout station operates in the cashier-assisted mode, while FIG. 3B illustrates the turntable 52 at the second position according to which the checkout station operates in the self-checkout mode. Because of the rotation of the turntable 52, the checkout station may be conveniently converted between the cashier-assisted and self-checkout modes.

In one embodiment, the base platform 48 may include latches 62 for locking the turntable 52 to the first or the second position. A release 60 that is accessible to an operator may control, through control cables (not shown) to the latches 62, the lock and release of the latches 62 so that turntable 52 may be locked to the first or the second position, or released for turning between the first and second positions. The release 60 may be placed at a position that is easily accessible by an operator. For example, the release may be located on a side surface of the base platform as shown in FIG. 3A. Within the base platform 48, the turntable 52 may be supported by a support (not shown). For example, in one embodiment, the support may be a cylindrical column that includes bearings that allow the turntable 52 to rotate. Further, the display screen 56 and the barcode scanner 54 may also be wired through wires underneath the top surface of and within the base platform 48. These wires are placed in such way that when the turntable 52 rotates back and forth, they do not tangle.

Figure 4A:
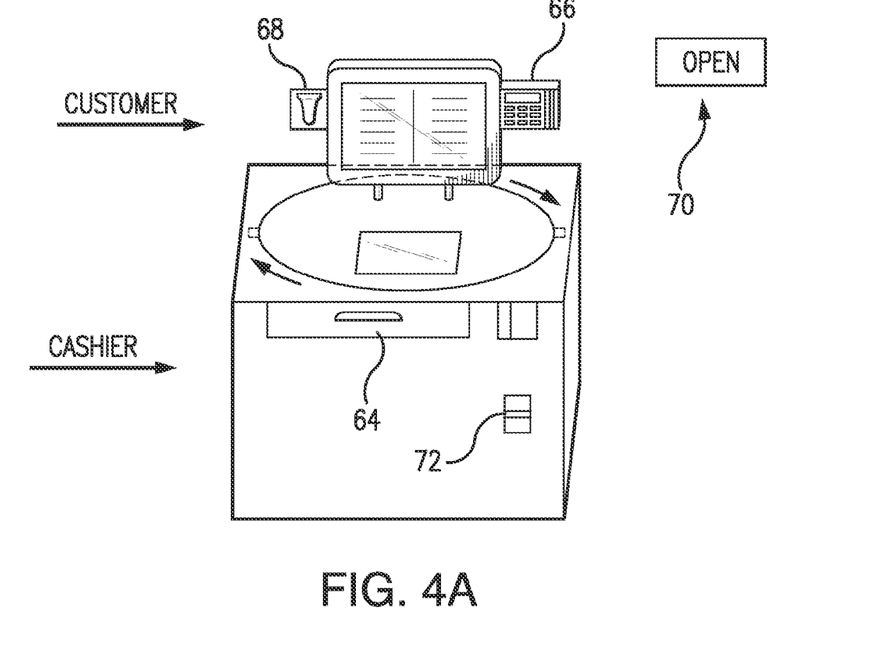
FIGS. 4A and 4B illustrate a checkout station according to another exemplary embodiment of the present invention.
Figure 4B:
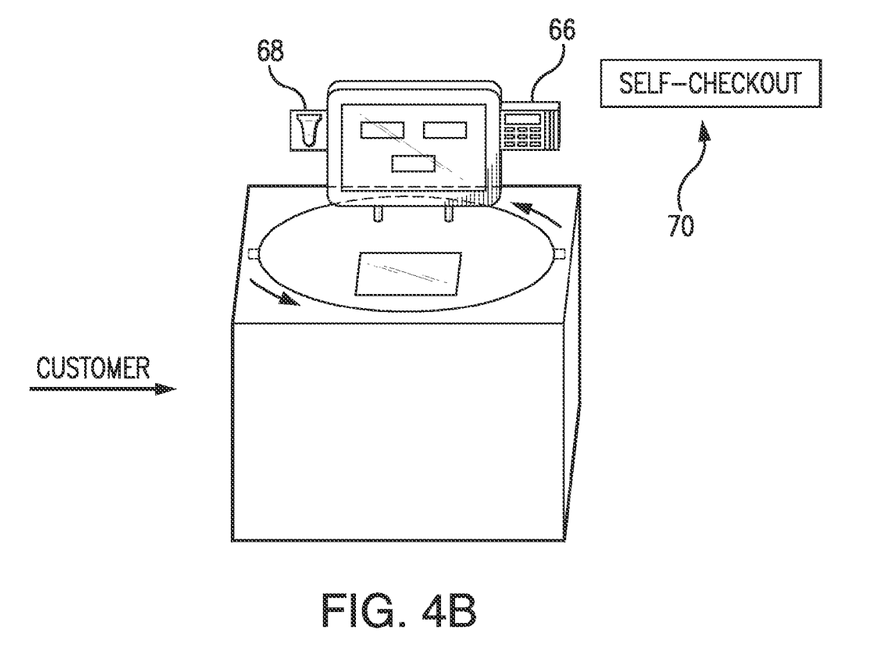

Additionally, the checkout station may include other components. FIGS. 4A and 4B illustrate a checkout station according to another exemplary embodiment of the present invention, in which FIG. 4A reflects the first cashier-assisted checkout mode of the checkout station and FIG. 4B reflects the second self-checkout mode of the checkout station. In addition to the components as illustrated in FIGS. 3A and 3B, the checkout station may further include an optional cashier drawer 64 located at the first cashier side of the checkout station. Additionally, the checkout station may include a credit/debit card reader 66 that is situated on and can be rotated with the turntable 52. In one exemplary embodiment, the credit/debit card reader 66 may be fixedly and detachably attached to the display screen 56 so that the credit/debit card reader 66 rotates with the display screen 56 and barcode scanner 54. Additionally, the checkout station may also include an optional handheld barcode scanner 68 which may be placed either on the turntable 52, or off the turntable 52. In one embodiment, the handheld barcode scanner 68 may be fixedly and detachably attached to the display screen 56 so that the handheld barcode scanner 68 may be rotated along with the display screen 56. In an alternative embodiment, the handheld barcode scanner 68 may be placed on the top surface of the base platform (off the turntable 52) so that the handheld barcode scanner 68 does not rotate with the turntable 52. Additionally, the checkout station may include an electronic signage 70 that may indicate whether the checkout station is operating under the cashier-assisted mode or self-checkout mode.

The checkout station may further include a trigger for toggling between the first and second modes. In one embodiment, the checkout station may include a physical switch 72 that may switch the checkout station to the cashier-assisted mode or the self-checkout mode. In another embodiment, the trigger (not shown) may be automatically set by the latches 62 so that when the turntable 52 is locked in a first position, the trigger may cause the checkout station to run in the cashier-assisted mode, and when the turntable 52 is locked in a second position, the trigger may cause the checkout station to run in the self-checkout mode.

Figure 5:
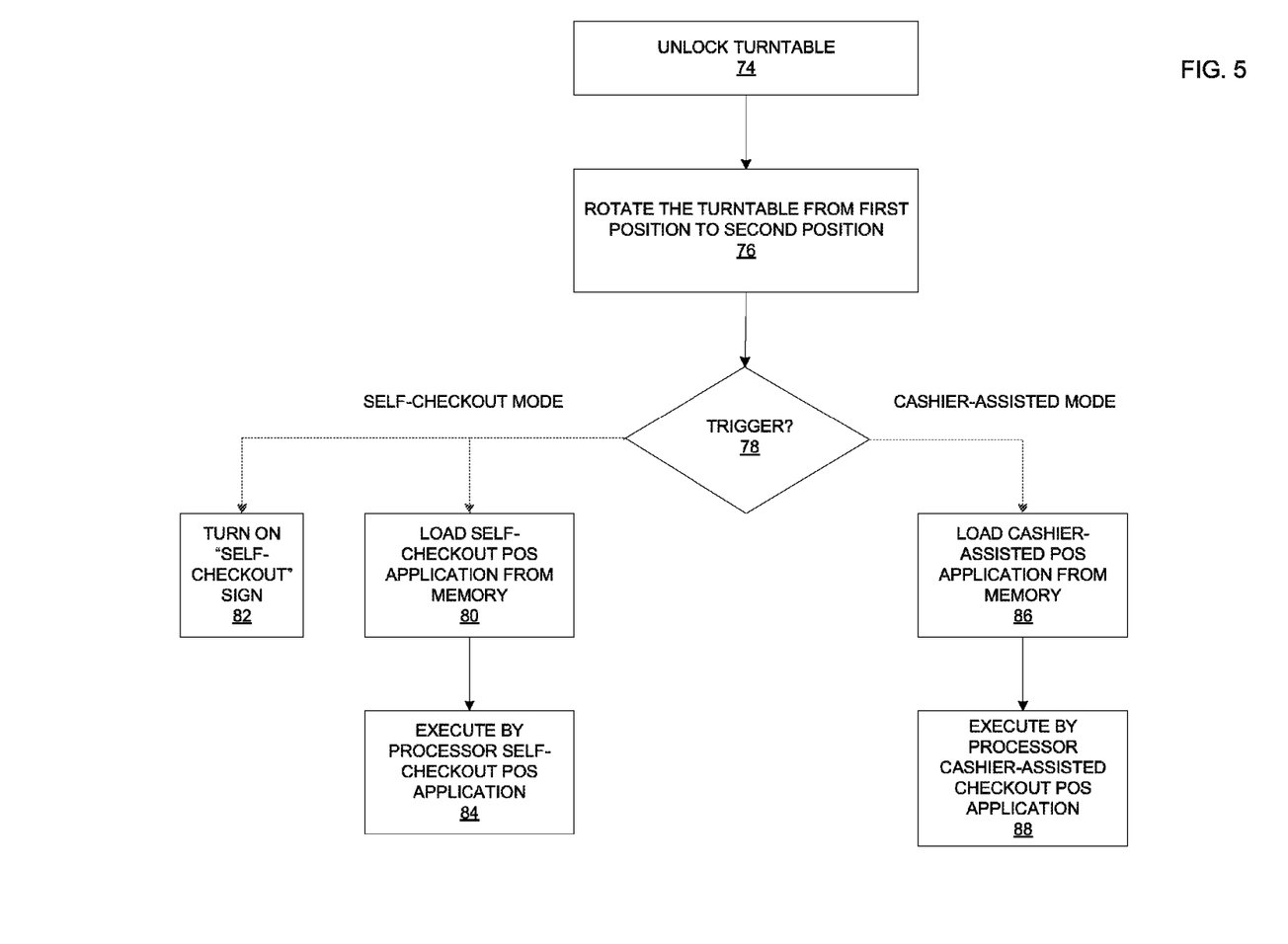
FIG. 5 illustrates a process to use the checkout station according to an exemplary embodiment of the present invention.

FIG. 5 illustrates a process to use the checkout station according to an exemplary embodiment of the present invention. At 74, the turntable of the convertible checkout station may be unlocked by an operator. At 76, the turntable may be rotated from a first position to a second position so that the orientation of the barcode scanner and display screen may be changed from a first direction to a second direction. For example, the turntable may be rotated from a first mode for cashier use to a second mode for self-checkout, or vice versa. At 78, a trigger may be engaged. A processor may be configured to determine whether the trigger indicates the start of a self-checkout mode or a cashier-assisted mode of operation. If the operation is for the self-checkout mode, at 80, the processor may be configured to load a self-checkout POS application from memory. At 84, the processor may be configured to execute the self-checkout POS application. The execution of the self-checkout POS application may include a graphic user interface (GUI) designed for a customer on a display screen. At 82, the processor may also send out a signal to turn on an electronic signage to indicate that the checkout station is for self-checkout. Alternatively, if the operation is for cashier-assisted checkout, at 86, the processor may be configured to load a cashier-assisted POS application from memory. At 88, the processor may be configured to execute the cashier-assisted POS application. The execution of the cashier-assisted POS application may include a graphic user interface (GUI) designed for a cashier on a display screen.

Figure 6:
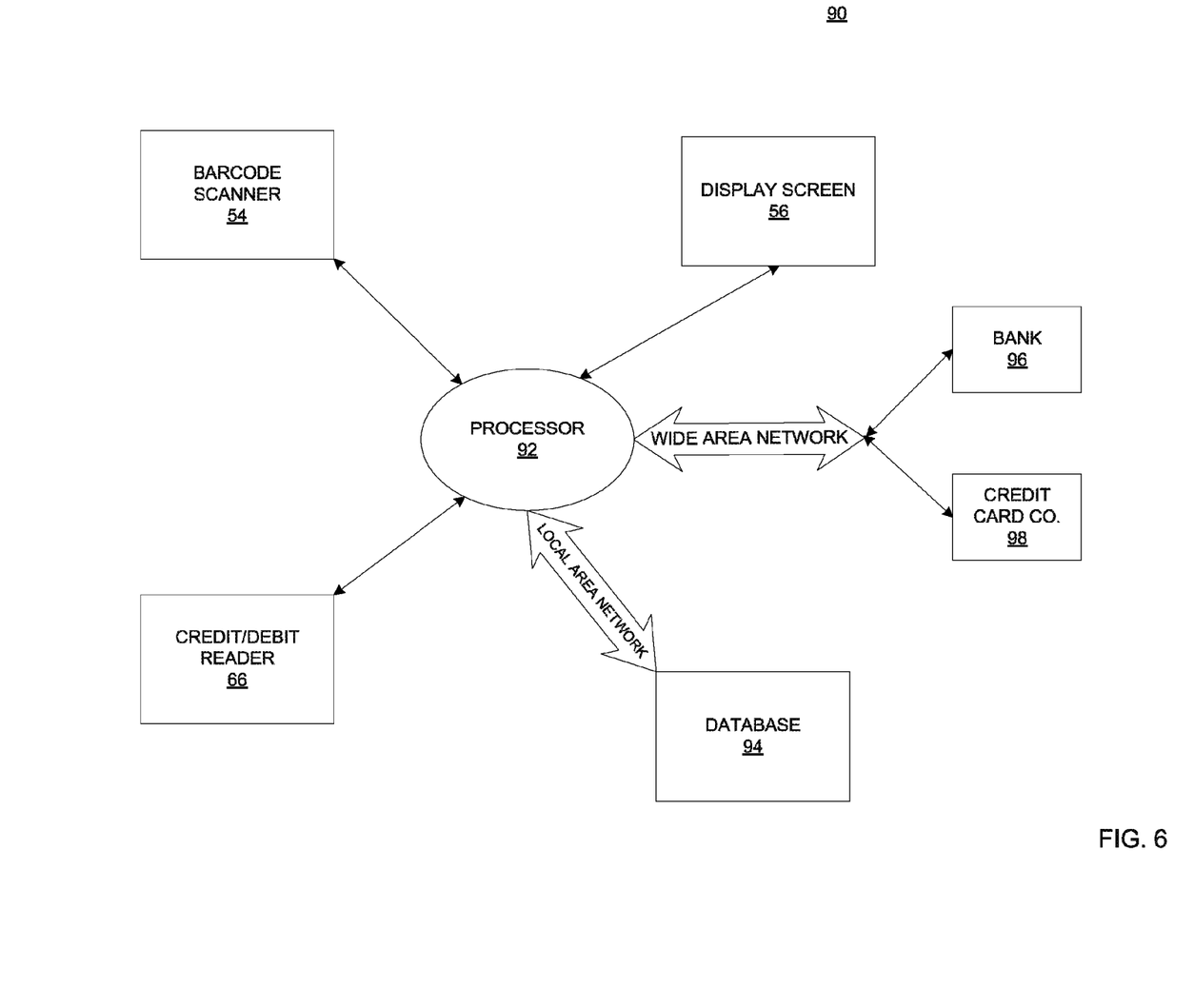
FIG. 6 illustrates a system for a checkout station according to an exemplary embodiment of the present invention.

FIG. 6 illustrates a system for a checkout station according to an exemplary embodiment of the present invention. As shown in FIG. 6, a POS system 90 may include a processor 92 that is communicatively connected to a barcode scanner 54 (including a single optic scanner, a bi-optic scanner, imager, and/or a handheld scanner), display screen 56, and credit/debit reader 66 as shown in FIGS. 3A, 3B, 4A, 4B. Further, the processor 92 may be connected to a database 94 via a local area network (LAN), where data relating to inventory may be stored. Additionally, processor 92 may have access to a wide area network (WAN) through which the processor 92 may be connected to banks 96 and credit card issuers 98 so that a customer may receive onsite approval of the transaction.

In the event of a customer checkout, the customer may bring the merchandise that he intends to purchase to a checkout station. Each merchandise may have already been associated with a barcode. For example, the barcode may be printed on a label that is attached to the merchandise. Additionally, the customer may have store-issued membership card (for member-only club stores) or discount card which may also include barcode identifications to associate the customer to a customer account. Finally, the customer may have coupons that may also include barcodes to apply discounts to the sale transaction. The cashier (in cashier-assisted mode) or the customer (in the self-checkout mode) may start the transaction by scanning the membership card or the discount card to establish the customer's identification and associate the same with an existing account stored in database 94. Subsequently, the cashier/customer may scan each merchandise to be purchased by the customer. Since the barcode scanner 54 is oriented toward the operator, a barcode may be captured conveniently. The captured barcode may be transmitted to the processor 92 which may be configured to record the merchandise corresponding to the barcode in a list as an item to be checked out. After the cashier/customer scans all of the items of the customer, the cashier/customer may scan customer's coupons for further discounts towards the final purchase price. After counting for all items and discounts for a final purchase price, the customer may pay for the purchase with cash or cash equivalents such as a debit/credit card through the debit/credit reader 66. The POS system 90 may complete the transaction by issuing a receipt to the customer and accounting the checked-out merchandise in the inventory database.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, and specification.

What is claimed is:

1. A checkout station, comprising:
a base platform including a top surface with a circular hollow;
a circular turntable mounted in the hollow, the turntable being rotatable between a first position and a second position and including a top surface having an opening; and
a barcode scanner attached to the turntable and directed in a first direction in the first position and in a second direction in the second position,
wherein the barcode scanner is situated underneath the opening in the top surface of the turntable; and
a display, wherein the display is attached to the turntable, and the display is directed in a first direction with respect to the first position and moves with the turntable to be directed in a second direction with respect to the second position, and wherein
when the turntable is at the first position, the display is directed in the first direction and functions as the cashier display and the checkout station is configured for cashier-assisted checkouts, and
when the turntable is at the second position, the display is directed in the second direction and functions as the customer display and the checkout station is configured for self-checkouts.

2. The checkout station of claim 1, further comprising a credit/debit card reader, wherein the credit/debit card reader is attached to a side of the display.

3. The checkout station of claim 1, further comprising a handheld barcode scanner, wherein the handheld barcode scanner detachably sits on a cradle that is attached to a side of the display.

4. The checkout station of claim 1, wherein the display includes a touch screen.

5. The checkout station of claim 1, wherein the turntable rotates within a range of 180 degrees.

6. The checkout station of claim 1, wherein the first position and the second position are substantially 180 degrees apart.

7. The checkout station of claim 1, further comprising a switch for switching to a cashier-assisted checkout mode if the turntable is in the first position and to a self-checkout mode if the turntable is in the second position.

8. The checkout station of claim 1, further comprising a processor that is configured to load and execute a cashier-assisted point-of-sale (POS) application if the turntable is in the first position, and to load and execute a self-checkout POS application if the turntable is in the second position.

9. The checkout station of claim 1, wherein the barcode scanner is one of an optic scanner, a bi-optic scanner, and an image-based scanner.

10. The checkout station of claim 1, wherein the opening in the top surface of the turntable is covered by a transparent material.

11. The checkout station of claim 1, further comprising:
an electronic sign separate from the display; and
a processor programmed to send a signal to control the electronic sign to indicate that the checkout station is operating in a cashier-assisted checkout mode when the turntable is in the first position, and to send a signal to control the electronic sign to indicate that the checkout station is operating in a self-checkout mode when the turntable is in the second position.

12. The checkout station of claim 1 wherein no further movement of the display relative to the rotation of the turntable is needed to orient the display for use with the checkout station.

13. The checkout station of claim 1 wherein the display comprises a single display screen used when the checkout station is configured for cashier-assisted checkouts and configured for self-checkouts.

14. The checkout station of claim 1 wherein only one rotation of the turntable positions the barcode scanner and the display in the proper orientation whether the checkout station is configured for cashier-assisted checkouts and configured for self-checkouts.

15. The checkout station of claim 1 wherein the display is non-rotatably attached to the turntable.

16. A checkout system, comprising:
a turntable rotatable between a first position and a second position;
a display fixedly attached to the turntable, wherein the display is directed in a first direction with respect to the first position and moves with the turntable to be directed in a second direction with respect to the second position, and wherein when the turntable is at the first position, the display is directed in the first direction and functions as the cashier display, and when the turntable is at the second position, the display is directed in the second direction and functions as the customer display;
an electronic sign separate from the display; and
a processor programmed to;
execute a point-of-sale (POS) application in a cashier-assisted checkout mode, display a first interface for the cashier-assisted checkout mode on the display, and send a signal to control the electronic sign to indicate that the checkout system is operating in the cashier-assisted checkout mode when the turntable is in the first position, and
execute the POS application in a self-checkout mode, display a second interface for the self-checkout mode on the display, and send a signal to control the electronic sign to indicate that the checkout system is operating in the self-checkout mode when the turntable is in the second position.

17. The checkout system of claim 16, wherein the checkout system runs in the cashier-assisted checkout mode if the turntable is at the first position and in the self-checkout mode if the turntable is at the second position.

18. The checkout system of claim 16, further comprising a barcode scanner, wherein the barcode scanner is attached to the turntable, and the barcode scanner is directed in a first direction with respect to the first position and a second direction with respect to the second position.

19. The checkout system of claim 16, further comprising a credit/debit card reader, wherein the credit/debit card reader is attached to a side of the display.

20. The checkout system of claim 16, further comprising a handheld barcode scanner, wherein the handheld barcode scanner detachably sits on a cradle that is attached to a side of the display.

21. The checkout system of claim 16, wherein the turntable rotates within a range of 180 degrees.

22. The checkout system of claim 17, further comprising a switch for switching to the cashier-assisted checkout mode if the turntable is in the first position and to the self-checkout mode if the turntable is in the second position.

23. The checkout system of claim 16, further comprising:
a base platform including a top surface with a circular hollow,
wherein the turntable is a circular turntable mounted in the hollow and includes a top surface having an opening, and
the barcode scanner is situated underneath the opening in the top surface of the turntable.

24. A method of operating a checkout system, wherein the checkout system includes a turntable moveable between a first position and a second position, a display fixedly attached to the turntable, an electronic sign separate from the display, and a processor that is configured to execute a point-of-sale (POS) application, wherein the display is directed in a first direction with respect to the first position and moves with the turntable to be directed in a second direction with respect to the second position, and wherein when the turntable is at the first position, the display is directed in the first direction, and when the turntable is at the second position, the display is directed in the second direction, the method comprising:
in response to turning the turntable to the first position, executing, by the processor, the POS application in a cashier-assisted checkout mode, displaying a first interface for the cashier-assisted check mode on the display such that the display functions as the cashier display, and sending by the processor a signal to control the electronic sign to indicate that the checkout system is operating in the cashier-assisted checkout mode, and
in response to turning the turntable to the second position, executing, by the processor, the POS application in a self-checkout mode, displaying a second interface for the self-checkout mode on the display such that the display functions as the customer display, and sending by the processor a signal to control the electronic sign to indicate that the checkout system is operating in the self-checkout mode.

25. The method of claim 24, wherein the checkout system further includes a base platform including a top surface with a circular hollow, the turntable is a circular turntable mounted in the hollow and includes a top surface having an opening, and the barcode scanner is situated underneath the opening in the top surface of the turntable.

* * * * *